United States Patent [19]

Kraft et al.

[11] Patent Number: 5,115,270
[45] Date of Patent: May 19, 1992

[54] PHOTOGRAPHIC COLOR COPYING APPARATUS AND EXPOSURE CONTROL PROCESS

[75] Inventors: Walter Kraft, Zurich; Jürgen Nehring, Wettingen, both of Switzerland

[73] Assignee: Gretag Systems, Bothell, Wash.

[21] Appl. No.: 595,111

[22] Filed: Sep. 28, 1990

[30] Foreign Application Priority Data

Sep. 29, 1989 [CH] Switzerland .......... 3556/89

[51] Int. Cl.⁵ .......................... G03B 27/80
[52] U.S. Cl. ............................ 355/38; 355/77
[58] Field of Search ............... 355/38, 68, 77; 356/404, 444; 358/76, 80; 359/251, 41, 73, 260, 261, 278

[56] References Cited

U.S. PATENT DOCUMENTS

| | | | |
|---|---|---|---|
| 3,085,468 | 4/1963 | Hehn | 355/38 |
| 3,612,655 | 10/1971 | Lincoln et al. | 350/160 |
| 4,087,176 | 5/1978 | Nigg | 355/35 |
| 4,230,408 | 10/1980 | Nigg | 355/35 |
| 4,407,566 | 10/1983 | Rosenberg et al. | 350/404 |
| 4,500,178 | 2/1985 | Yeh | 350/404 |
| 4,589,766 | 5/1986 | Fursich et al. | 355/38 |
| 4,631,551 | 12/1986 | Vergona | 346/108 |
| 4,783,684 | 11/1988 | Rauh | 355/38 |
| 4,951,084 | 8/1990 | von Stein et al. | 355/38 |
| 4,979,032 | 12/1990 | Alessi et al. | 358/76 |

OTHER PUBLICATIONS

"Electro-Optically Tuned Spectral Filters: A Review", Optical Engineering, Nov./Dec. 1981, vol. 20, No. 6, pp. 837-845.
"Electrically Turnable Narrowband Optical Filter", Electronics Letters, Sep. 18, 1975, vol. 11, No. 19.

*Primary Examiner*—L. T. Hix
*Assistant Examiner*—D. Rutledge
*Attorney, Agent, or Firm*—Burns, Doane, Swecker & Mathis

[57] ABSTRACT

A photographic color copying apparatus and an exposure control process includes measuring filters variable as a function of the spectral sensitivities of different copy materials, in particular electro-optical filters. The variable measuring filters are constructed in the manner of Solc filters or Lyot-Ohman filters and include polarizers and electro-optical crystals, preferably liquid crystals.

36 Claims, 7 Drawing Sheets

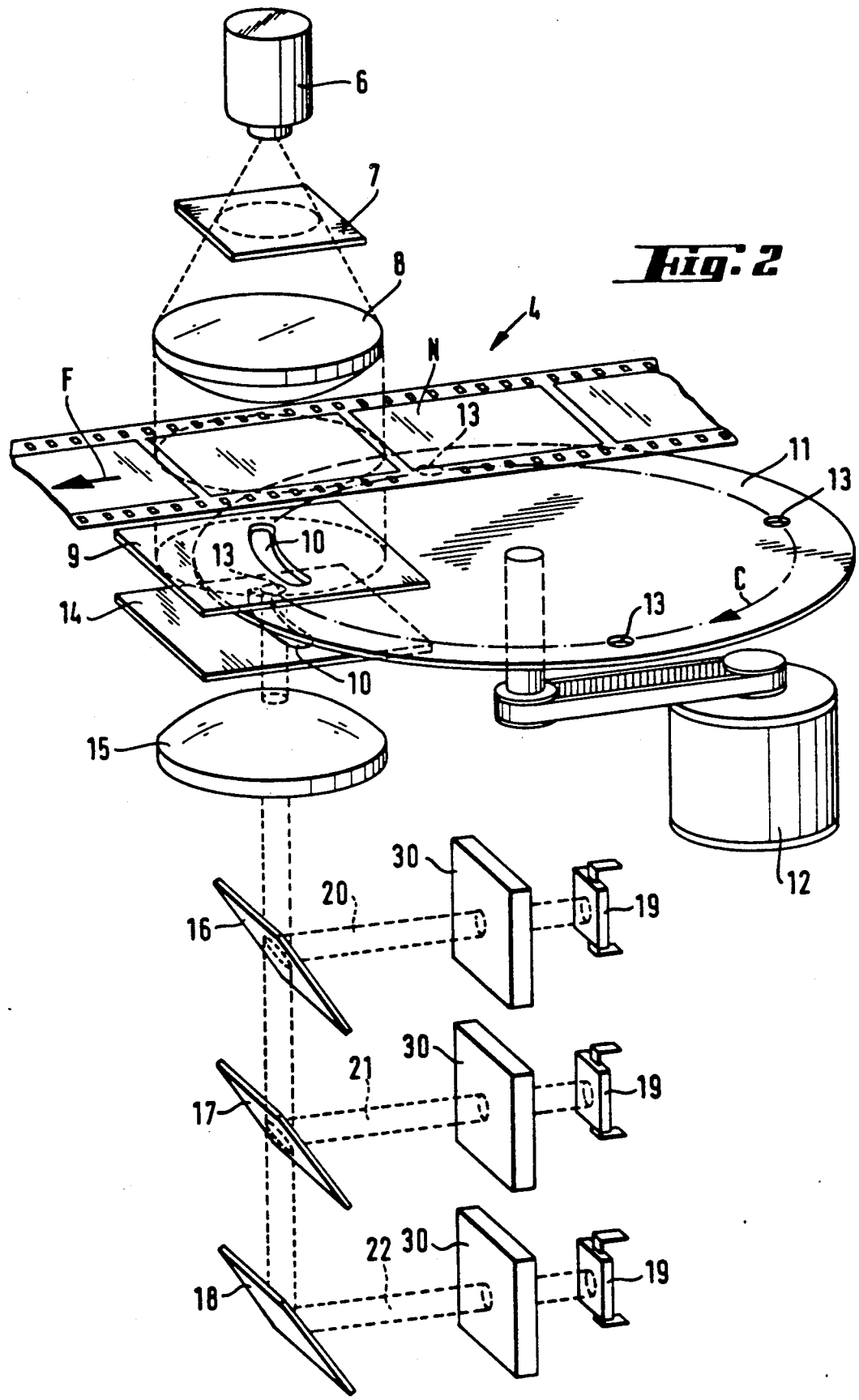

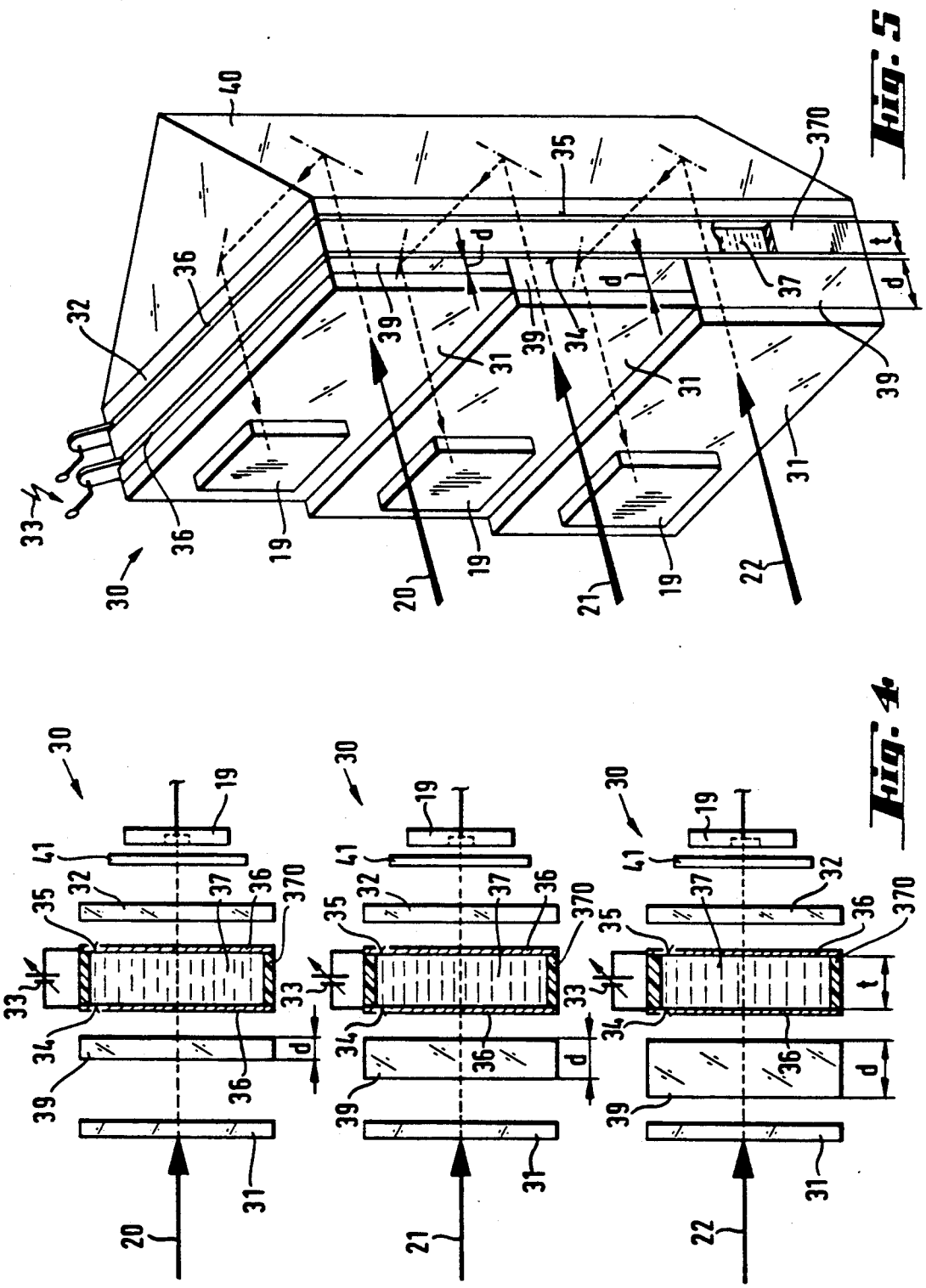

PHOTOGRAPHIC COLOR COPYING APPARATUS AND EXPOSURE CONTROL PROCESS

BACKGROUND OF THE INVENTION

The invention concerns a photographic color copying apparatus and a process for the control of exposure in a photographic color copying apparatus.

To determine the optimum exposure times and quantities of copying light in a photographic color copying apparatus the color permeabilities or color densities of a copy master in the three basic colors are determined. It is necessary in the process to adapt the spectral sensitivity of the measuring apparatus as accurately as possible to the spectral sensitivity of the copy material used. This requirement is the result of the experience that in case of deviations of the spectral sensitivities of the measuring layout and the copy material, an increase in the density of a color of the copy master does not lead to a corresponding change in the quantity of copying light and that therefore color falsification may result; this is discussed for example in the publication by R. W. G. Hunt, "The Reproduction of Color", p. 284.

From U.S. Pat. No. 4,589,766 a photographic color copying apparatus is known, wherein an attempt is made to satisfy this requirement by using special optical measuring filters. The disadvantage of this method is apparent when different copy materials are used, for example originating with different manufacturers. For every change of copy material, new measuring filters adapted to the altered spectral sensitivities of the copy material must be used, which considerably increases costs and requires additional setup times. Furthermore, in view of the extreme precision required, these measuring filters are very difficult to produce and are therefore expensive. Another expense is caused by the logistic management of the different measuring filters adapted to the spectral sensitivities of the copy material. In addition, the choice of a certain set of measuring filters in most cases restricts the user to a certain type of a certain manufacturer of the copy material. Furthermore, strong fluctuations of the properties of the copy masters due to different products, inadequate exposures, over- and under-exposures, etc. create high requirements relative to the photographic color copying apparatus and the exposure control process in order to attain an image quality acceptable to amateur photographers.

SUMMARY OF THE INVENTION

The present invention eliminates these disadvantages and solves the problem of determining the color extract values which govern the correct exposure settings and which are adapted to the copy material used, without having to change the optical measuring filters. The color copying apparatus and exposure control process according to the invention makes it possible to obtain an acceptable image quality even under the aforementioned unfavorable conditions. The solution according to the invention is also relatively simple in its design and cost effectiveness.

BRIEF DESCRIPTION OF THE DRAWINGS

Other objects and advantages of the present invention will become more apparent from the following detailed description of preferred embodiments as described with reference to the drawings in which:

FIG. 2 is an embodiment of the measuring apparatus designated in its entirety by the symbol 4 in FIG. 1;

FIGS. 4-7 are schematic views of four embodiments of electro-optic filters;

DETAILED DESCRIPTION OF THE PREFERRED EMBODIMENTS

Figure 1:
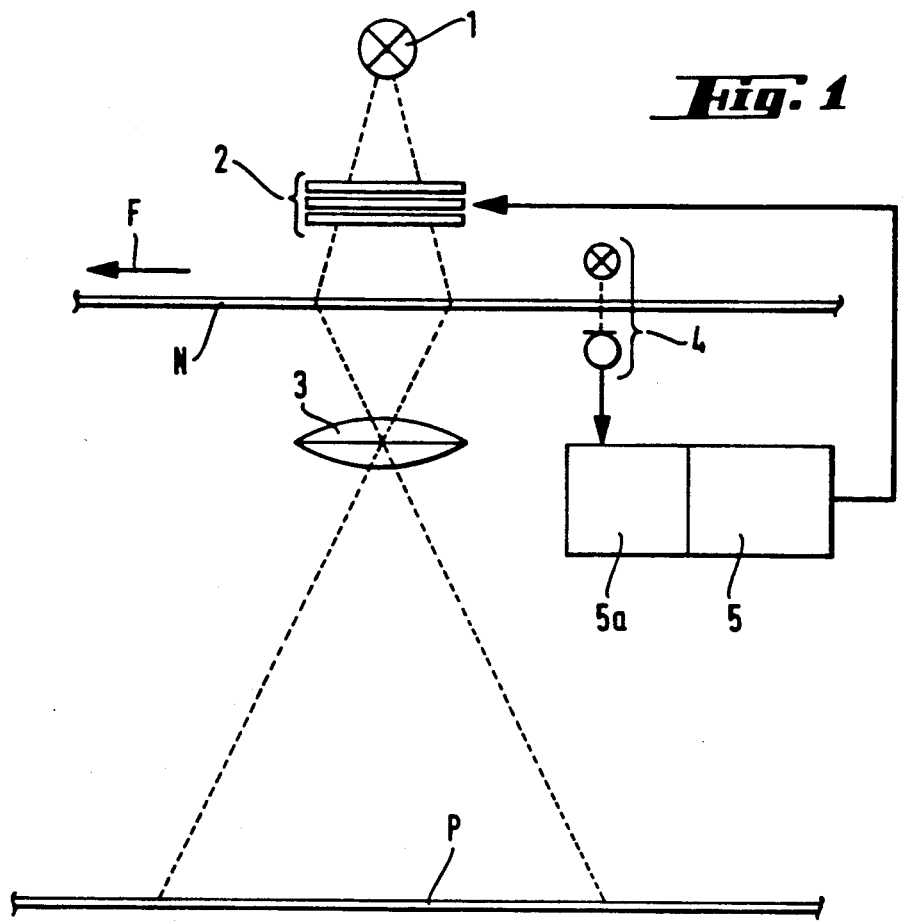
FIG. 1 is a fundamental diagram of the photographic color copying apparatus according to the invention.

The photographic color copying apparatus shown in FIG. 1 is essentially formed of two stations, through which preferably strip shaped copy master N passes in succession. The direction of transport is indicated by the arrow F. In the first station the copy master N is scanned and in the second station the copy master N is reproduced on a photosensitive copy material P.

Figure 3:
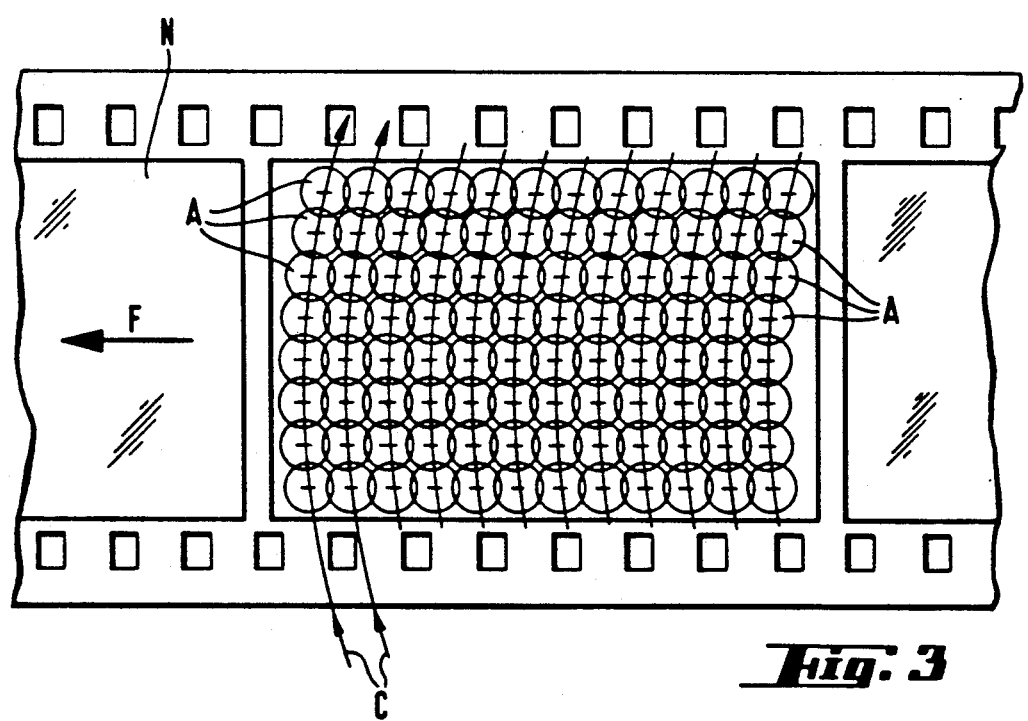
FIG. 3 is a scanning pattern of a copy master.

With the exception of the differences to be explained later in the measuring apparatus of the first station the photographic color copy apparatus is constructed in a manner similar to that of conventional devices of this type, for example, those known in U.S. Pat. Nos. 4,092,067, 4,101,216 and 4,279,505. In FIG. 1, therefore only the essential components necessary for the understanding of such a color copy apparatus are shown. The apparatus comprises a copy light source 1, a set of servo-controlled color filters 2 or the like, an imaging optical device 3, a measuring layout 4 including a source of measuring light and photoelectric detectors and a computer and control unit 5, 5a for exposure control. Photographic color copy devices of this fundamental design are for example the high capacity printer models 3139, 3140, 3141 or 3142 of the present applicant, which are in world wide use. In the aforementioned high capacity printers the copy master N is measured in sections, for example with a resolution of about 100 or more scanning areas A (points) per master (FIG. 3). Each scanning area A is resolved into the three basic colors red R, green G and blue B and a triplet of measured values, the three so-called color extract values for the basic colors, are determined. These approximately 300 color extract values are evaluated in a known manner by different criteria to determine the necessary quantities of copying light to subsequently control the exposure of the photosensitive copy material P. However, the photoelectric analysis of the copy master could also be carried out by scanning by line or area, wherein preferably photoelectric detectors in line or area configurations are used.

FIG. 2 shows the measuring layout designated generally by 4. The copy master N is located in the beam path of a source of measuring light 6. Immediately following the source of measuring light 6 is a thermal protection filter 7. The measuring light passes through a first condenser lens 8 onto the copy master N. Under the copy master N the scanning device itself is located. The scanning device includes a scanning disk 11 with apertures 13, placed rotatingly in the direction of the arrow C between two parallel slit diaphragms 9 and 14. A motor 12 is provided to drive the scanning disk 11. Each of the slit diaphragms 9 and 14 is formed of a circular arc shaped slit 10. The slits 10 are usually located coincidingly over each other. However, their mutual positions may be layered in a manner such that the effective slit length may be adapted to the existing format of the copy master N (for example, 135 or 110 films). The width and curvature of the slits 10 are correlated with the aperture diameter and the distance of the apertures 13 from the axis of rotation of the scanning disk 11. In the present embodiment the scanning disk 11 has four apertures 13, which, while the disk rotates in the direction of the arrow C along the effective slit length, briefly let the measuring light pass through. In this manner, the copy master is divided into individual, point shaped scanning areas A. FIG. 3 shows a resultant typical scanning pattern of a copy master. The scanning areas A are located in lines adjacent to each other. Each line extends approximately perpendicularly to the direction of transport F. The slightly inclined shape of the lines away from the transport direction F is the result of the superposition of the transport in the direction F of the copy master N and the rotation C of the apertures 13 of the scanning disk. Following its passage through the scanning device, the measuring light arrives through a second condenser lines 15 on a partially permeable blue mirror 16, which preferably is placed inclined relative to the beam path by about 45°. The blue component of the measuring light is deflected by the blue mirror 16, which for the rest of the light merely represents a permeable glass plate. The remaining part of the measuring light finally arrives at a partially permeable red mirror 17, which deflects the red component of the light and allows only the green component to pass. The blue and the red mirrors preferably are dichroitic mirrors. In this manner, the measuring light is resolved into its three basic colors blue, red and green. Preferably, the three basic color components of the measuring light are deflected approximately into the same direction. Ideally, the beam paths 20, 21, 22 of the basic colors B, G, R extend from the deflector means 16, 17, 18 approximately parallel to each other.

The measuring layout 4 also includes special measuring filters 30 located in the beam paths 20, 21, 22 of the basic colors, whose spectral transmission of absorption behavior may be controlled preferably individually as a function of the spectral sensitivities of the copy material P and/or the spectral absorptions of the copy master N. Following its passage through the measuring filters 30, the measuring light for each basic color impacts photoelectric detectors 19, located in the beam paths behind the measuring filters.

The variable measuring filters 30 include polarizing filters in the examples in FIGS. 4 to 8 and in particular include input polarizers 31 and output polarizers 32, and birefringent crystals 37 and 38. The input polarizers 31 are located in front of the birefringent crystals 37 and 38 in the beam paths 20, 21, 22 of the basic colors B, G, R. The output polarizers 32 are located in front of the photoelectric detectors 19. The spectral transmission or absorption behavior of the measuring filters 30 is controlled by affecting the effective birefringence of the birefringent crystals 37 and 38 with variable electric or magnetic fields. Correspondingly, a distinction is made between electro-optic and magneto-optic crystals. Preferably, as shown in FIGS. 4 to 8, so-called electro-optic filters with electro-optic crystals are used.

Figure 7:
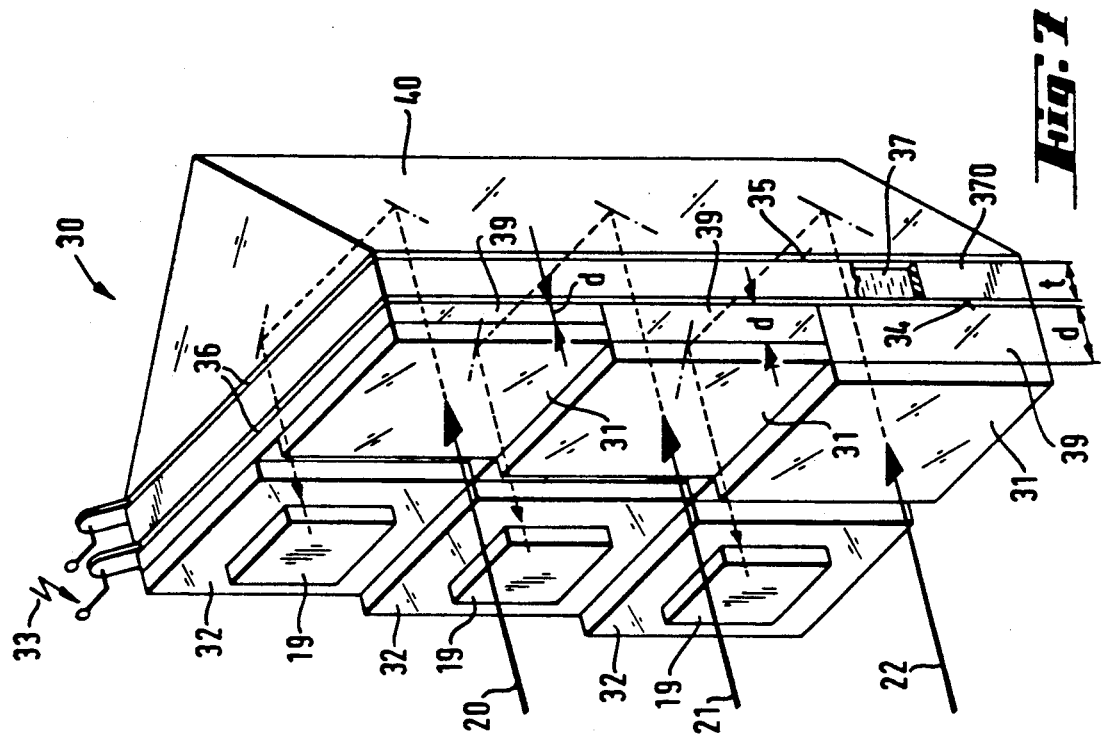
Figure 8:
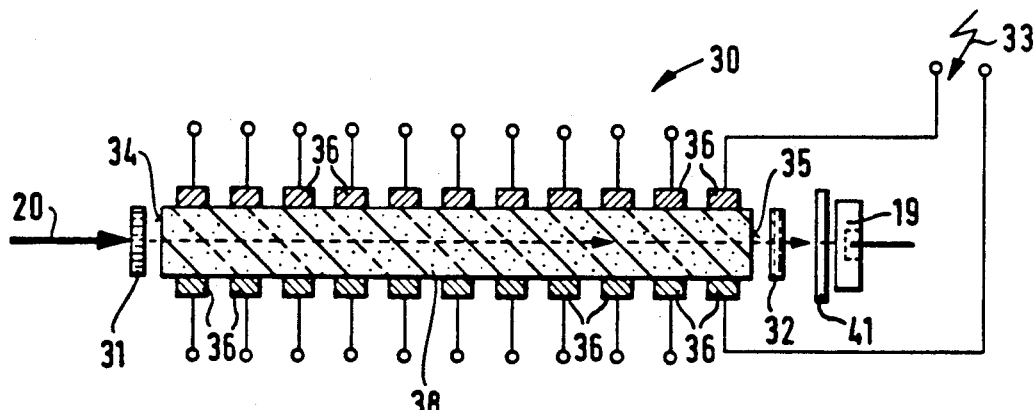
FIG. 8 is another embodiment of an electro-optic filter.

The electro-optic crystals may be liquid crystals 37 (FIGS. 4-7) or electro-optic solid crystals 38 (FIG. 8). While to vary the effective birefringence of electro-optic solid crystals 28, which usually are of the adenosinedihydrogenphosphate ADP or potassium-dihydrogenphosphate KDP type, high field strengths are needed, thus requiring control voltages of the order of magnitude of kilovolts, in applications with liquid crystals 37 only a few volts are sufficient. Preferably therefore liquid crystals 37 are used, preferably of the nematic type. The liquid crystals 37 are located within approximately parallelepiped shaped cells 370, which are transparent at least on their approximately plane parallel light inlet and light outlet surfaces 34 and 35. The inner surfaces of the liquid crystal cells 370 are treated so that the liquid crystals 37 are oriented twisted or, preferably are of a nematic type uniformly parallel to each other. Depending on whether the dielectric anisotropy of the liquid crystals cells is chosen to be positive or negative, the effective birefringence may be increased by the application of an electric field to the cells. The liquid crystal cells 370 are aligned in the beam paths 20, 21, 22 of the basic colors B, G, R in a manner such that their light inlet and outlet surfaces 34 and 35 are essentially perpendicular to them.

The variation of the effective birefringence of the birefringent liquid crystals 37 shown in FIGS. 4 to 7 takes place in the longitudinal direction, by applying the electric field parallel to the beam paths 20, 21, 22. For this, transparent electrodes 36 are provided at the light inlet and outlet surfaces 34 and 35; they may be connected with one or several power sources 33. The electrodes 36 preferably consist of indium-tin oxide or a similar compound.

Figure 6:
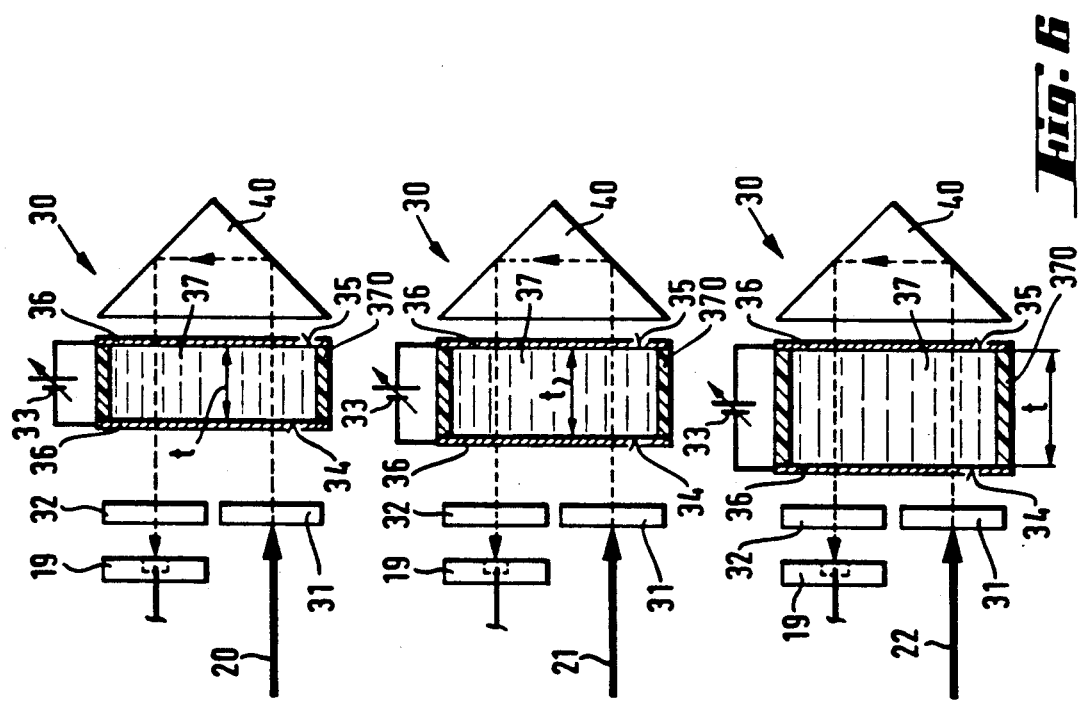

The liquid crystal cells 370 for the individual basic colors B, G, R are usually of the same thickness t as shown in FIGS. 4, 5 and 7, but they may also have different thicknesses as indicated for example in FIG. 6. By selecting different thicknesses t of the liquid crystal cells 370 (FIG. 6) the transmission behavior of each of the filters for the basic colors blue B, green G and red R may be adjusted individually to the corresponding spectral sensitivity of the copy material P. If the spectral measuring sensitivities for the three basic colors are to have approximately equal band widths, the crystal thicknesses t will be selected approximately in the proportion of $a_b: a_g: a_r$, with $a_b, a_g, a_r$ representing the median wave lengths of the spectral measuring sensitivities in the three basic colors blue, green and red. For the usual copy materials P this proportion amounts for example to about 0.7:0.8:1.

If liquid crystal cells 370 of similar thickness are used, the same objective, i.e., the individual adaptation of the measuring sensitivities, may also be attained by providing between the input polarizers 31 and the light inlet surfaces 34 (or between the light outlet surface 35 and the output polarizers 32) birefringent solid crystal platelets 39 of different thicknesses d, as indicated in FIGS. 4, 5 and 7.

Figure 10:
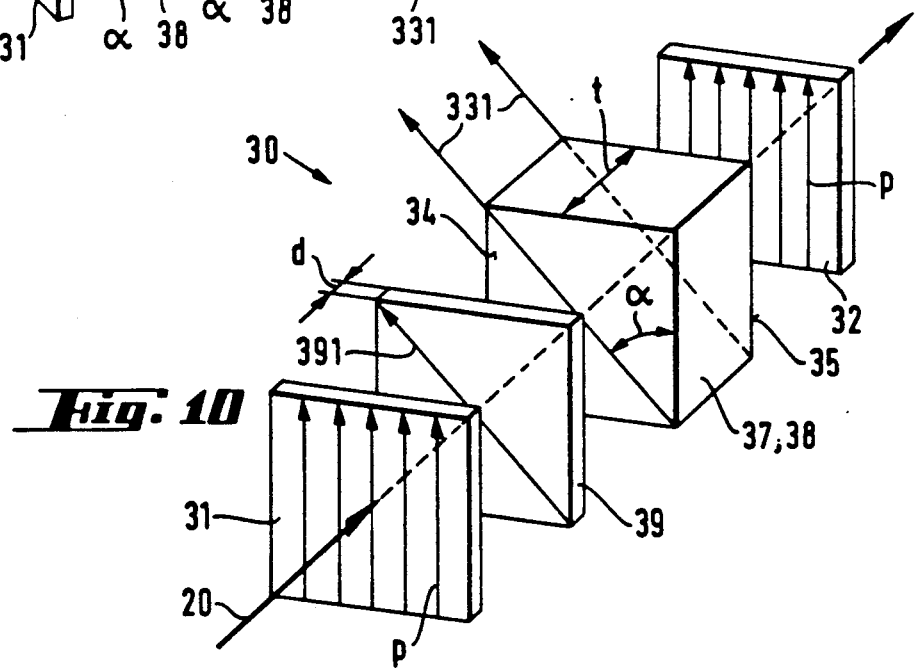
FIG. 10 is a fundamental diagram of a single stage Lyot-Ohman filter.

Preferably, the solid crystal platelets 39 consist of quartz, sapphire or a similar birefringent material. The solid crystal platelets 39 are placed in front of the light inlet surfaces 34 in a manner such that their optical axes 391 are preferably parallel with or perpendicular to the corresponding axes 331 of the liquid crystals 37. (FIG. 10)

In place of the individual liquid crystal cells 370 of equal thickness t in the beam paths 20, 21, 22 of the basic colors B, G, R, a single longitudinal liquid crystal cell 370 of constant thickness t may be provided so that it crosses the beam paths 20, 21, 22 as shown in FIGS. 5 and 7. This measure, together with the solid crystal platelets 39 of different thicknesses d, makes it possible to use commercial liquid crystal cells 370, for example the FSS-1153 type of the OPTREX Co.

The electro-optical filters 30 may be configured in two different ways, in the manner of a Lyot-Ohman filter or a Solc filter. These two electro-optical filter types and in particular their mode of operation, are described for example in the article by W. J. Gunning in Optical Engineering, November/December 1981, Vol. 20, No. 6, pages 837–845, or in an article by H. A. Tarry in Electronics Letters, Sep. 18, 1975, Vol. 11, No. 19, pages 471–472 (Solc filters only). The following discussion of electro-optical filters of this type is therefore restricted to their overall configuration and their general mode of operation.

FIGS. 4 and 5 show two embodiments of Lyot-Ohman filters. FIG. 4 shows three separate so-called single stage Lyot-Ohman filters, and FIG. 5 shows a two stage Lyot-Ohman filter with a single elongated liquid crystal cell 370 having a uniformly parallel orientation structure of the liquid crystals 37. In both embodiments, the liquid crystal cells 370 are located between the input and the output polarizers 31 and 32. The passage directions p of the two polarizers 31 and 32 are aligned parallel to each other (FIG. 10). The liquid crystal cells 370 are located in the beam paths 20, 21, 22 of the basic colors B, G, R in a manner such that the planes defined by the optical axes 331 of the liquid crystals 37 and the beam path 20, 21, 22 form an angle $\alpha$ of about $\pm 20°$ to $\pm 50°$, preferably about 45°, with the passage directions p of the input polarizers 31.

The embodiment of the two-stage Lyot-Ohman filter shown in FIG. 5 has a deviating prism 40 connected with the output polarizer 32, which reverses the direction of the measuring light by 180°, so that the measuring light again passes through the filter prior to its detection by the detector 19. However, in place of the deviating prism 40, other deviating means may also be provided, for example two mirrors inclined at 45° to the beam path. To limit the wave length range detected, in front of each photoelectric detector 19 a narrow band bandpass filter 41 tuned for the basic color B, G, R may be located. The band pass filters 41 may be separate elements or may be integral with the photoelectric detectors 19. According to a preferred embodiment, the electro-optic filters 30, the solid crystal platelets 39, the detectors 19 optionally with the bandpass filters 41 and possibly the deviating means 40 may be adhesively bonded into a single monolithic block, preferably with an optical cement (FIG. 5).

Figure 9:
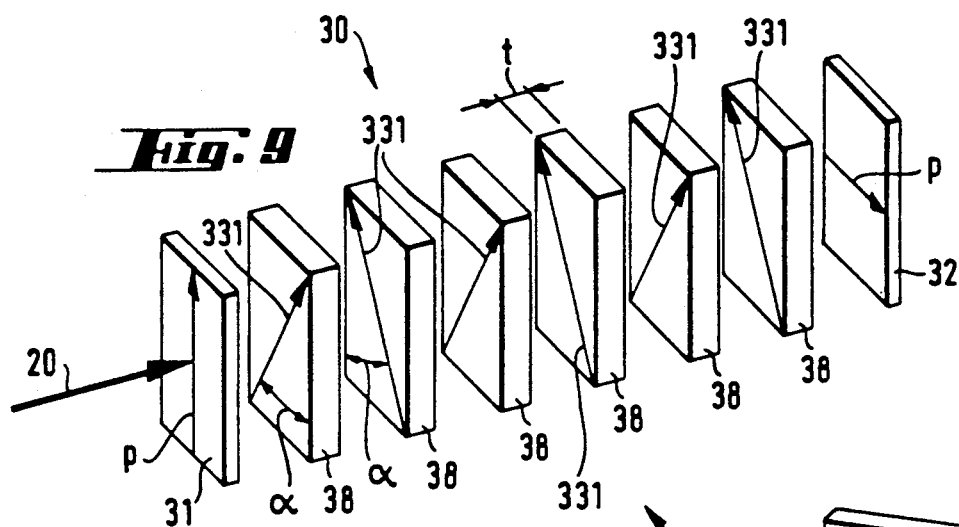
FIG. 9 is a fundamental diagram of a Solc filter.

FIGS. 6 to 8 show embodiments of the so-called Solc filters. In the examples shown in FIGS. 6 and 7, the birefringent effect of the electro-optical crystals 37 and 38 is varied by a longitudinal electrical field. In FIG. 8 a Solc filter is shown, the spectral transmission or absorption behavior of which may be controlled by a transverse electrical field whose field lines extend perpendicularly to the beam paths 20, 21, 22 of the basic colors B, G, R. The directions of passage p of the input and output polarizers 31 and 32 are preferably aligned perpendicularly relative to each other (FIG. 9). The electro-optical crystals 37 and 38 are located so that the planes defined by their optical axes 331 and the beam paths 20, 21, 22 form with the passage directions p of the input polarizers 31 an angle $\alpha$ preferably of about $\pm 180°/4n$, wherein n is the number of stages of the Solc filter. Preferably, the electro-optical filters 30 of the longitudinal Solc type are in two stages, as seen in FIGS. 6 and 7. The angle $\alpha$ preferably amounts to $\pm 22.5°$. To achieve this, deviating prisms 40 or other deviating means are provided behind the light outlet surfaces 35 of the liquid crystal cells 370, for deflecting the measuring light by 180°, so that it again passes through the filter. If the planes defined above and containing the optical axes 331 of the liquid crystals 37 form with the direction of polarization of the incident measuring light preferably an angle $\alpha$ of about $\pm 22.5°$, the corresponding angle for the deflected measuring light which passes through the filter in the reverse direction, amounts to about $-22.5°$. The input and output polarizers 31 and 32, together with the photoelectric detectors 19, are located in these two embodiments on the same side of the birefringent crystals 33. Here again, to limit the spectra detected, narrow band bandpass filters 41, tuned to each basic color B, G, R may be provided in front of the photoelectric detectors 19.

Preferably, as seen in FIG. 7, the liquid crystal cell (n), the polarizers 31, 32, and optionally the deviating prisms 40 and the detectors 19, possibly together with the bandpass filters 41, may be combined in a single monolithic block, preferably bonded together with an optical amount.

In the transverse Solc filter shown in FIG. 8 an electro-optical solid crystal 38 is located between the input and output polarizers 31, 32. For reasons of clarity, only one filter for one of the basic colors, here blue B, is displayed. The electro-optical solid crystal extends in the direction of the beam path 20 and is equipped on its longitudinal sides with a plurality of opposing electrodes 36. Via the electrodes 36, a different electrical field may be produced in the individual longitudinal sections of the electro-optical solid crystals 38, leading to a different orientation of its optical axes 331 relative to the passage direction p of the input polarizer 31. Preferably, the electrical fields are chosen so that the optical axes 331 in the individual longitudinal sections are inclined alternatingly by about $\pm 180°/4n$ relative to the direction of passage p of the input polarizer. The longitudinal sections of the opto-electrical solid crystal 38 represent the individual stages of the transverse Solc filter. In the present example the filter 11 has a stepped configuration. As further shown in FIG. 8, for example in front of the photoelectric detector 19 a narrow band bandpass filter 41 may be provided, to limit the spectrum detected.

The embodiments shown in FIGS. 4–7 of the electro-optical filter 30 were described in connection with liquid crystals 37, located in approximately parallelepiped cells 370. In place of the liquid cells 370, electro-optical solid crystals may also be provided in keeping with the embodiments described. However, to vary their birefringent properties, as mentioned above, electrical control voltages of the order of magnitude of kilovolts must be applied. FIG. 9 illustrates the principle of a multistate Solc filter with alternating positive and negative angles of inclination $\alpha$ of the optical axes 331 of the electro-optical crystals 37 and 38. The thickness t of the individual filter stages is constant. The passage directions of the input and output polarizers 31 and 32 aligned perpendicularly to each other and the projection of the optical axes 331 of the electro-optical crystals 37 and 38 are indicated by arrows.

FIG. 10 shows the principle of a single stage Lyot-Ohman filter. The passage directions p aligned parallel to each other of the input and output polarizers 31 and 32 and the projections of the optical axes 331 of the electro-optical crystals 37 and 38 are again indicated by arrows.

The mode of operation of both types of filters is based on the birefringent effect of the electro-optical crystals 37,38 as a consequence of the directional dependence or anisotropy of the optical properties relative to crystal orientation. The measuring light of each of the basic colors B, G, R is split in a birefringent crystal into two components with different directions of propagation, an ordinary component obeying the Snellius law of refraction, and an extraordinary component exhibiting a different behavior. The two components are polarized linearly, so that their directions of vibration are perpendicular to each other. Due to the dependence on direction (anisotropy) of the properties and in particular the index of refraction for the ordinary and the extraordinary components, the components propagate at different velocities. As a consequence of the different propagation velocities, there is a path difference for the two components at the light outlet surface 35 of the birefringent crystal 37, 38. This difference depends on the thickness t of the crystal 37, 38, the wave length and the birefringence. The birefringence, defined as the difference of the refractive indices for the ordinary and extraordinary components, may be affected by an electrical field (or a magnetic field). The dependence of the birefringence on an electrical field is discussed for example in the article by W. C. Gunning in Optical Engineering, November/December 1981, Vol 20, No. 6, pages 837-845.

The measuring light linearly polarized by the input polarizer 31, is split in the birefringent crystal 37, 38 into two components polarized perpendicularly to each other, and having a path difference which may be varied during their passage through the crystal. The output polarizer 32 returns the two components to a common plane of oscillation, so that they may be in interference. Depending on the difference in path, a more or less complete extinction or amplification of the spectral transmission occurs.

Figure 11:
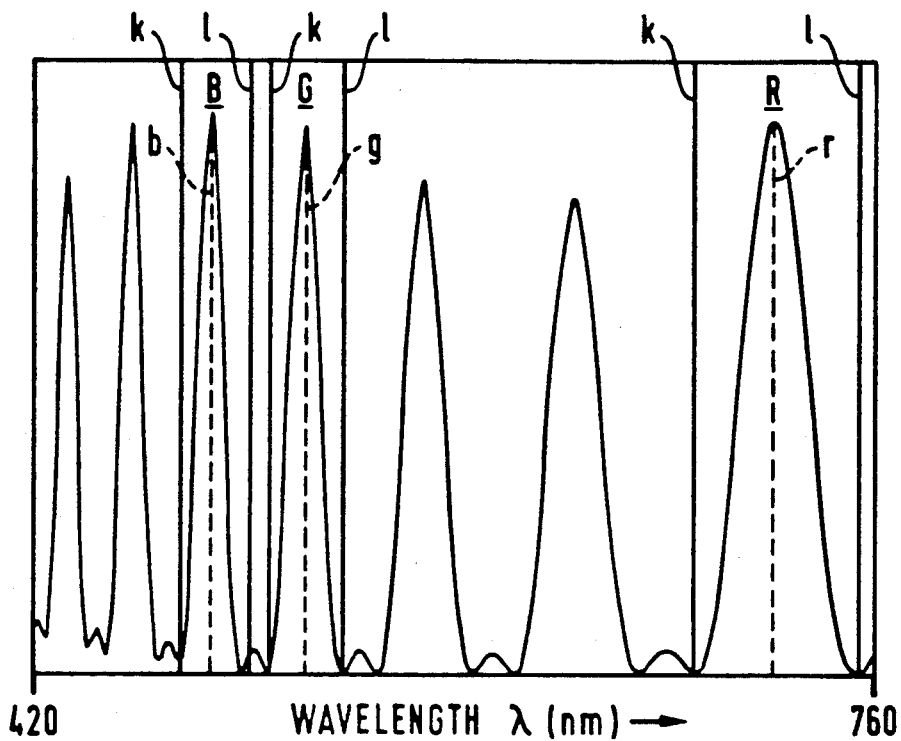
FIGS. 11-13 are graphs illustrating the process of the invention.

In FIG. 11, the spectral transmission variation is shown for the example of a two-stage Solc filter. The spectral transmission variations for electro-optical filters 30 of the Lyot-Ohman type are qualitatively similar. In particular, in the diagram shown the transmission variations for the individual basic colors are combined. The vertical lines k and l represent respectively the short wave k and the long wave l absorption edge of the bandpasses 41 selectively chosen to limit the wave length range detected. The transmission maxima for the individual base colors blue B, green G and red R are indicated correspondingly by b, g, r.

Figure 13:
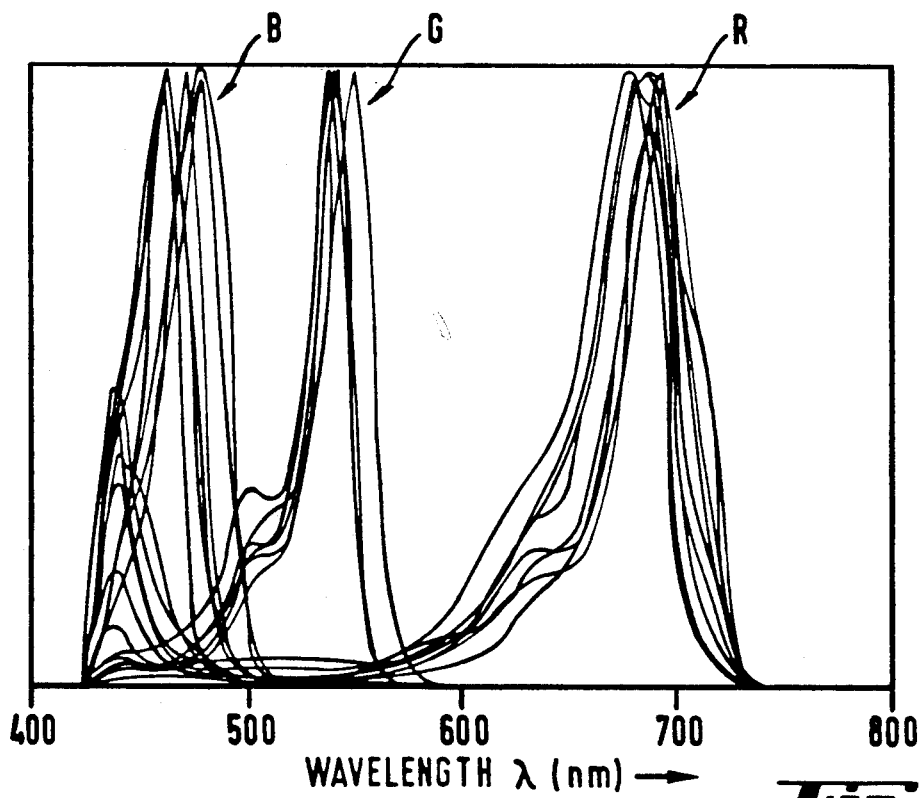
Figure 12:
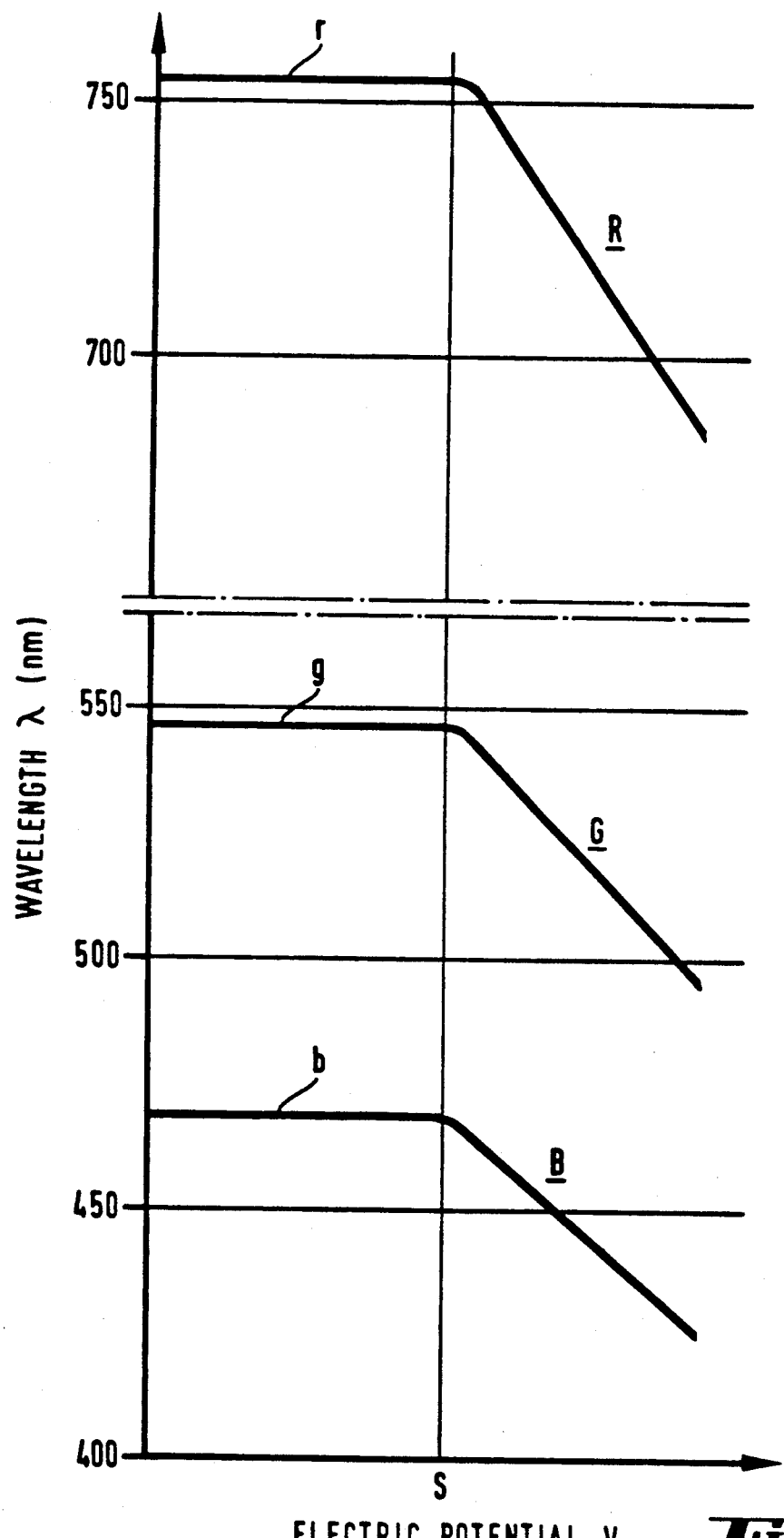

FIG. 12 shows the voltage dependent shift of the transmission maxima b, g and r. The control voltage V applied becomes effective beginning with a threshold voltage S only. From this threshold voltage S on, the transmission maxima b, g, r are displaced in an approximately linear manner with rising control voltages in the direction of shorter wave lengths. If the examples shown in FIGS. 4 to 8 are used for the electro-optic filters 30 with liquid crystal cells 370, a control voltage of a few volts already provides an adequate displacement of the transmission maxima b, g, r. In addition, the electro-optic filters for the prevailing base colors B, G and R may also be controlled separately. In this manner, the variable measuring filters 30 may be adapted individually to the different spectral sensitivities of the various copy materials, which, as seen in FIG. 13, may scatter over a relatively broad wave length range.

By the photographic color copy apparatus and the exposure control process the requirements and the varying spectral sensitivities of the different copy materials used may be taken into account in a simple and optimal manner. The evaluation of the copy master N can always be adapted rapidly to the changing spectral sensitivities of the copy material, without having to replace the measuring filters in each case. It is further possible to control the measuring filters 30 in a second step in keeping with the spectral absorptions of the coloring agents of the copy master N. In this fashion, for example color casts and/or color dominants of the copy master N may be determined and from them corrected copy light quantities derived. The determination of the copy light quantities as a function of the color casts and/or color dominants is carried out similarly to the method described in EP-A-312 499, the disclosure of which is hereby incorporated by reference in its entirety. By this process acceptable qualities of the copies are obtained even under unfavorable conditions due to strong fluctuations of the properties of the copy masters, such as for example different makes, unsuitable exposures, under and overexposure, etc. In addition, the solution according to the invention is cost effective and relatively simple and allows great flexibility relative to the copy master N and the copy materials P.

It will be appreciated by those of skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Photographic color copying apparatus for reproducing a copy master on a photosensitive copy material, comprising:
    a projection layout;
    a measuring layout for photoelectrically analyzing a copy master and for determining color extract values adapted to the spectral sensitivity variations of a copy material, said measuring layout further including
        a plurality of electro-optical measuring filters which are individually adjustable relative to their spectral transmission or absorption behavior and may be varied by application of an electrical field, said electro-optical filters including polarizing filters with an input polarizer and an output polarizer, and electro-optical liquid crystals located within an approximately parallelepiped cell that is transparent at least at its approximately plane parallel light inlet and light outlet surfaces and
        a plurality of photoelectric detectors; and,
    an exposure control device to further process said color extract values to determine quantities of copying light impacting the copy material and to cooperate with the measuring layout and the projection layout.

2. Copying apparatus according to claim 1, wherein the liquid crystals are of a nematic type, having a preferably parallel orientation structure.

3. Copying apparatus according to claim 1, wherein the electro-optical crystals are solid crystals with approximately plane parallel light inlet and light outlet surfaces.

4. Copying apparatus according to claim 3, wherein the solid crystals are of the adenosinedihydrogenphosphate (ADP) or potassiumdihydrogenphosphate (KDP) type.

5. Copying apparatus according to claim 1, wherein the light inlet and the light outlet surfaces are located essentially perpendicular to a beam path of base colors of the measuring layout.

6. Copying apparatus according to claim 1, wherein the liquid crystals assigned to individual base colors of the measuring layout have different thicknesses.

7. Copying apparatus according to claim 3, wherein a single liquid crystal cell or a single solid crystal of constant thickness is located so that it crosses a beam path of each base color associated with the measuring layout.

8. Copying apparatus according to claim 1, wherein a birefringent solid crystal platelet is located in front of the light inlet surface in a beam path of each base color associated with the measuring layout.

9. Copying apparatus according to claim 8, wherein the solid crystal platelets assigned to the individual base colors have different thicknesses.

10. Copying apparatus according to claim 8, wherein the solid crystal platelets consist of quartz, sapphire or a similar birefringent material.

11. Copying apparatus according to claim 8, wherein the solid crystal platelets are aligned so that their optical axes are located in a same plane as corresponding axes of the electro-optical crystals.

12. Copying apparatus according to claim 1, wherein the electro-optical filters are constructed as Solc filters, wherein passage directions of the input and output polarizers are perpendicular to each other, and planes defined by optical axes of the electro-optical crystals and beam paths of each base color associated with the measuring layout include an angle of about $\pm 180°/4n$, wherein n is a number of stages of the Solc filter.

13. Copying apparatus according to claim 12, wherein the Solc filter is in two stages, and the angle $\alpha$ amounts to $\pm 22.5°$.

14. Copying apparatus according to claim 1, wherein the electro-optical filters are constructed as Lyot-Ohman filters, and the passage directions of the input and output polarizers are aligned parallel to each other, and planes defined by optical axes of the electro-optical crystals and beam paths of base colors associated with the measuring layout include an angle of about $\pm 20°$ to $\pm 50°$ with the passage directions of the input polarizers.

15. Copying apparatus according to claim 1, wherein light deflecting means, such as deflecting prisms are located in the beam paths of the base colors behind the electro-optical filters, such that a measuring light of each base color is deflected by about 180°, so that prior to impacting photoelectric detectors it again passes through the electro-optical filters.

16. Copying apparatus according to claim 1, wherein the electrical field is approximately perpendicular to beam paths of base colors associated with the measuring layout.

17. Copying apparatus according to claim 1, wherein the electrical field is approximately parallel to beam paths of base colors associated with the measuring layout, with transparent electrodes being provided at light inlet and outlet surfaces of the measuring filter.

18. Copying apparatus according to claim 17, wherein the electrodes consist of a compound such as indium-tin oxide.

19. Copying apparatus according to claim 15, wherein the electro-optical filters are combined in a single monolithic block with all of their individual components and optionally with the solid crystal platelets and the deflecting means together with the photoelectric detectors.

20. Copying apparatus according to claim 19, wherein the electro-optical filters with all of their individual components and optionally with the solid crystal platelets and the deflecting means together with the photoelectric detectors are bonded together with an optical element.

21. Process for the control of the exposure in a photographic color copying apparatus, comprising the steps of:
   photoelectrically scanning areas of a copy master with a measuring layout;
   projecting measuring light coming from each scanning area in three basic colors onto electro-optical measuring filters whose variable spectral transmission or absorption behavior is controlled in accordance with spectral sensitivities of photosensitive copy material on which an image is to be copied by varying a birefringent effect of electro-optical crystals in an electrical field which is applied in a longitudinal direction, approximately parallel to a beam path of the base color involved, or perpendicularly to said beam path, by at least one power source;
   detecting the measuring light following its passage through the variable measuring filters;
   determining from the detected measuring light color extract values corresponding to color permeabilities or color densities of the copy master for each said basic color;
   determining from the color extract values and certain criteria quantities of copying light required for production of copies on a photosensitive copy material.

22. Process according to claim 21, wherein liquid crystals are used as the electro-optical crystals, said liquid crystals being of a nematic type and having a parallel orientation structure, enclosed in an approximately parallelepiped transparent cell and having transparent electrodes located at light inlet and outlet surfaces standing approximately perpendicular to a beam path of the measuring light, between which a longitudinal electrical field is generated approximately parallel to the beam path of the measuring light.

23. Process according to claim 21, wherein solid crystals are used as the electro-optical crystals, which preferably are of the adenosinedihydrogenphosphate (ADP) or potassiumdihydrogenphosphate (KDP) type, and wherein transparent electrodes are located at light inlet and outlet surfaces standing approximately perpendicular to a beam path of the measuring light, between which a longitudinal electrical field is generated approximately parallel to the beam path of the measuring light.

24. Process according to claim 22, wherein the measuring light of each base color initially passes through an input polarizer, then is conducted into the liquid crystal cell and finally is conducted to an associated photoelectric detector after passing through an outlet polarizer.

25. Process according to claim 24, wherein the measuring light is passed onto electro-optical filters of the Lyot-Ohman type, wherein the input and output polarizers are aligned parallel relative to their light permeability directions and located parallel to the light inlet surfaces of the liquid crystal cells so that they include an angle of about ±20° to about ±50° with planes defined by their optical axes and the light propagation direction.

26. Process according to claim 24, wherein the measuring light of each base color is passed onto electro-optical filters of the Solc filter type, wherein the inlet and outlet polarizers are aligned perpendicularly relative to each other with their passage directions and are located parallel to the light inlet of the liquid crystal cells in a manner such that planes defined by their optical axes and the light propagation direction alternatingly include with the passage directions an angle of about ±180°/4n, wherein n is the number of stages in the Solc filter.

27. Process according to claim 24, wherein the measuring light of each base color is deflected by about 180° after passing through the electro-optical filter by deflecting means so that it again passes through the electro-optical filter in reverse direction.

28. Process according to claim 24, wherein solid crystal platelets of varying thicknesses are located between the input polarizers and the liquid crystal cells.

29. Process according to claim 28, wherein the polarizers, the electro-optical crystals, and optionally the solid crystal platelets and the deflecting means are bonded together with the detectors into a monolithic block by an optical cement.

30. Process according to claim 21, wherein the measuring light coming from each scanning area and split into the base colors is measured at two differently controlled spectral transmissions and absorptions of electro-optical filters, wherein one is regulated as a function of the spectral sensitivities of the copy material and the other as a function of the spectral absorptions of coloring agents of the copy master to determine color casts and/or color dominants of the copy master and that quantities of copying light determined are corrected in keeping with the color casts and/or color dominants detected.

31. Process according to claim 23, wherein the measuring light of each base color initially passes through an input polarizer, then is conducted into the solid crystals and finally is conducted to the associated photoelectric detector after passing through an outlet polarizer.

32. Process according to claim 31, wherein the measuring light is passed onto electro-optical filters of the Lyot-Ohman type, wherein input and output polarizers are aligned parallel relative to their light permeability directions and located parallel to light inlet surfaces of the solid crystals so that they include an angle of about ±20° to about ±50° with the planes defined by their optical axes and the light propagation direction.

33. Process according to claim 31, wherein the measuring light of each base color is passed onto electro-optical filters of the Solc filter type, wherein the inlet and outlet polarizers are aligned perpendicularly relative to each other with their passage directions and are located parallel to the light inlet of the solid crystals in a manner such that planes defined by their optical axes and the light propagation direction alternatingly include with the passage directions an angle of about ±180°/4n, wherein n is a number of stages in the Solc filter.

34. Process according to claim 31, wherein the measuring light of each base color is deflected by about 180° after passing through the electro-optical filter by the deflecting means so that it again passes through the electro-optical filter in reverse direction.

35. Process according to claim 31, wherein solid crystal platelets of varying thicknesses are located between the input polarizers and the solid crystals.

36. Process according to claim 35, wherein the polarizers, the electro-optical filters, and optionally the solid crystal platelets and the deflecting means are bonded together with the detectors into a monolithic block by an optical cement.

* * * * *